April 14, 1931. E. R. SMITH 1,800,325
MEASURING INSTRUMENT
Filed Feb. 12, 1927
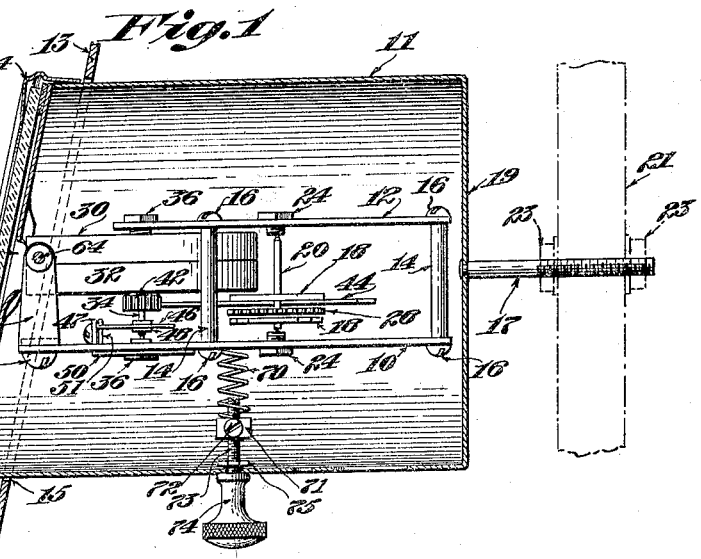

Patented Apr. 14, 1931

1,800,325

UNITED STATES PATENT OFFICE

EDWARD R. SMITH, OF MALDEN, MASSACHUSETTS, ASSIGNOR TO MUTHER MANUFACTURING COMPANY, OF BOSTON, MASSACHUSETTS, A CORPORATION OF MASSACHUSETTS

MEASURING INSTRUMENT

Application filed February 12, 1927. Serial No. 167,739.

This invention relates to an instrument for measuring the acceleration or deceleration of a moving body and more particularly to an instrument of that character adapted to be permanently mounted on the dash-board, cowl or other suitable part of an automobile as a part of its equipment and designed to be used from time to time for testing the efficiency of the brakes.

In making brake tests by the use of instruments for measuring the deceleration, it is, of course, necessary for accurate results that the instrument be level or set in a horizontal plane as any departure therefrom in any direction affects the indications. The placing of the instrument upon the floor of the car is very apt to throw it out of a level position because the floors of most cars which have been used at all are not level. There is almost always a variation in the springs supporting the body of the car due to wear and when this condition is present the car tips to a greater or less degree either laterally or longitudinally or both.

The main object of this invention is the provision of an instrument for testing the efficiency of brakes which is adapted for permanent mounting in an automobile where it can be seen by the operator and used when necessary to ascertain the exact condition of the brakes.

Another object of the invention is the provision of means whereby the instrument, when the brakes are to be tested by it, may be levelled quickly and with a minimum of effort to compensate for any departure of the car body from a horizontal level due to uneven compression of the springs or other causes.

A further object is to provide levelling means so constructed that the reading of the dial is not interfered with by changes due to levelling the instrument.

Other objects of the invention will be more specifically described and pointed out hereinafter.

My invention contemplates the permanent mounting on the dash-board or other suitable part of an automobile of a suitable instrument for measuring the deceleration of the vehicle and the provision of means for levelling the instrument to compensate for variations in the level of the body of the vehicle. In the form of the invention shown herein, for illustrative purposes only, a casing is rigidly secured to the automobile part and the measuring instrument is mounted therein with means for levelling it adapted for operation from outside the casing and so arranged that the reading of the dial of the instrument is not interfered with when adjustments are made. Any suitable measuring instrument may be employed and one such is shown being the instrument described in an application filed by me in the United States Patent Office, February 15, 1926, Serial No. 88,269.

In the accompanying drawings, illustrating one form of my invention, Figure 1 is a longitudinal sectional view of a casing rigidly secured to the dash-board of an automobile with a measuring instrument adjustably mounted within the casing and shown in side elevation; Fig. 2 is a front elevation of the casing and measuring instrument with the front end plate of the casing removed; Fig. 3 is a similar view of the front end of the device as it appears on the dash-board of the automobile; Fig. 4 is a vertical sectional view of a stop device and Fig. 5 is a view in perspective of the stop member.

In the drawings, 11 indicates a casing which may be of any suitable form but as shown is cylindrical. The casing is permanently fixed on the dash-board 13 of the automobile or other vehicle, the forward end of the casing projecting slightly through and being supported in a suitable hole 15 in the dash-board and the rear end being supported in a fixed position in any suitable manner as by a screw 17 centrally fixed to the rear end 19 of the casing and threaded through a fixed portion 21 of the body portion of the car and secured therein by suitable nuts 23. Although shown as affixed to the dash-board, the casing may be permanently mounted on any suitable part of the motor vehicle where its indications may be seen at all times by the operator of the vehicle and casings of various forms may be used to suit various types of measuring instruments.

Within the casing is mounted a measuring instrument constructed in accordance with my prior application, the use of which is preferable because it does not require levelling except to compensate for a tilting of the vehicle in a longitudinal direction. The said instrument employs two weighted levers swinging laterally in opposite directions which automatically compensate each other in case the instrument is inclined to a horizontal plane in a lateral direction. In referring to the various parts of the instrument, the reference numerals of the said application have been used in order to facilitate reference to said application.

The measuring instrument of my said application comprises the following. A lower base plate 10 and an upper plate 12 are secured together in spaced relation by a plurality of posts 14, the opposite ends of each being internally threaded to receive screws 16 for holding the frame rigidly together. A pair of weighted levers 18, adapted to swing in overlapping relation in horizontal planes, are pivotally mounted within the frame, each being secured on a vertical shaft 20, the pointed ends of which are journalled in jewelled bearing nuts 24 threaded through the plates 10 and 12.

Intermeshing gears 28 are secured one to each lever in order that they may move in unison. A disk dial 30 having its periphery turned down to form a flange 32 is fixed on a dial shaft 34 mounted in bearing nuts 36 which are threaded through the two plates of the frame. A pinion 42 is fixed on the shaft 34 for meshing with a gear segment 44 fixed on one of the lever shafts 20 so that the dial may be operated by the movement of the two levers 18. Suitable graduations 45 are marked on the flange of the dial. To hold the dial normally at the zero point and to return the levers to normal position when thrown out by a change in velocity, a hair spring 46 is secured at its inner end to a hub 48 fixed on the dial shaft 34 and the outer end is held by the upwardly turned extension 47 of a segment bracket 50, the end of the spring being gripped between the upwardly turned extension 47 and a square washer 51 held by a screw 56.

The weighted levers and the dial are so arranged and connected that when the dial is at the zero point, the centers of gravity of the two weighted levers lie in a straight line passing through the pivotal centers of the said levers and perpendicular to the longitudinal axes of the instrument and the motor vehicle and the hair spring 46 is adjusted to maintain the weighted levers normally in this position and the dial at the zero point. The levers are so mounted in overlapping relation that they may swing a slight distance rearwardly beyond the zero point before each strikes the shaft 20 of the other lever and is stopped. This permits an adjustment to the zero point from either side of said point.

For reducing the oscillations in the instrument when in use and to facilitate taking of readings from the dial, any suitable damping means may be employed, such, for instance, as that shown in the application for United States Letters Patent filed by Charles F. Cowdrey, July 9, 1925, for measuring instruments, Serial No. 42,443 now Patent No. 1,630,833 of May 31, 1927, or the stop device shown in my prior application hereinbefore referred to may be applied to the instrument.

In Figs. 4 and 5 of the drawings, I have shown a stop device of the general character described in my prior application but modified to permit of being adjustably mounted on the casing and to function without interfering with the levelling of the measuring instrument within the casing and independently of said stop. In the form shown, the casing is provided on one side with a longitudinal slot 54 in which is slidably mounted a T-shaped stop 55 having its shank threaded to receive a knob or handle 57 outside the casing. The stop is arranged with its head portion of the T in vertical position adapted to engage one of the weighted levers 18 at any level in which it may be adjusted. For locking the stop in any adjusted position along said slot, an elongated block 59 with its long axis parallel to the top portion of the stop may be fixed to or formed on the shank of the stop, the ends of the block being adapted to overlap the edges of the slot on the inner face of the casing, and to be drawn in tight engagement therewith by turning the knob up on the threaded portion of the shank. The squared portion 61 of the block fits in the recess and prevents any turning of the T-shaped head of the stop when in use. A nut 63 may, if desired, be mounted on the end of the shank to hold the knob therein and the end of the knob may be recessed at 65 to permit it to be turned sufficiently to lock or unlock the stop for adjustment in the slot without manipulation of the nut 63. This construction of the stop facilitates its insertion through the slot after the instrument is mounted therein for the stop may be turned sideways and inserted through the slot then turned to vertical position and drawn back slightly to bring the squared locking portion 61 into the recess where it may be locked by turning the knob up into tight engagement with the outer surface of the casing as shown in Fig. 4.

Any suitable means may be provided for levelling the instrument longitudinally and one such means is shown in the drawings for the purpose of illustrating my invention.

The instrument is pivotally mounted at the dial end by a pair of angle brackets 60 secured to the front end of the lower base plate 10 of the frame by screws 62, the upper ends of the brackets being pivotally hung on screws 64 set in the sides of the casing 11 with intermediate collars 66 mounted on said screws. It is preferable that the instrument be pivotally mounted at its dial end so that when it is moved in the levelling process there is no appreciable movement of the dial in relation to the opening in the front end of the casing. One form of means for levelling the instrument is shown and comprises a spring 70 having its lower end secured to a squared nut 71 and its upper end engaging loosely the lower face of the base plate 10, the lower end of the spring being held fastened to the nut by a screw 72. The nut is threaded on an upwardly extending screw 73 loosely mounted in the bottom of the casing and held in place between the inner end of a knurled knob 74 on the screw and an interior washer 75. The turning of the knob causes the nut to move upwardly or downwardly on the screw 73 and through the instrumentality of the spring either raises or lowers the frame on its pivot screws 64.

The casing may be provided with any suitable means for closing its forward end. As shown it is closed by a plate 80 having an opening 81 permitting the reading of the dial on the instrument, the plate 80 being covered by a glass cover 82 with an annular washer 83 between said glass cover and said plate. A rim 84 holds the closures in place and the opening 81 for reading the dial is marked with an arrow 85 or other suitable mark and the dial with a line 86 to indicate the zero point.

In the use of my invention in a motor vehicle, the casing is fixed on the dashboard of the vehicle or on any other suitable part as shown in Fig. 1 of the drawings, in a position where the indications on the dial may be read by the operator of the machine when necessary. So long as the dial is at the zero point when the machine is at rest on a horizontal plane, it is an indication that the instrument is in proper adjusted position for indicating the deceleration of the vehicle when moving. In case the zero indication on the dial is not in alinement with the arrow 85 then the operator turns in one direction or the other, the knob or handle 74 to level the instrument which result is attained when the zero line on the dial has come into alinement with the point of the arrow. The instrument is then ready for use to indicate deceleration or for any other purpose for which it may be employed. As shown in the drawings, the instrument is arranged for noting the deceleration of the vehicle and in that condition is primarily designed to measure the condition of the brakes, in order to indicate to the operator when his brakes require attention or are inefficient.

With the instrument properly adjusted a test may be made at any time by operating the car along a level stretch of road, applying the brakes and noting the indication given by the dial of the instrument. If a stop device is not used, then the deceleration indicated must conform to the standard required for efficient brakes on that particular make of car. If a stop device is used, it is generally set to bring the dial normally to that point at which inefficient brakes or brakes below the standard of efficiency would, on a test, produce no movement of the dial as explained in my prior application. The operator would in consequence in making a test merely have to note whether or not there was movement of the dial when the car was stopped by the application of the brakes. If there is no movement the brakes are inefficient, if there is movement they are efficient and conform to the standards laid down for brakes.

The use of a stop device is therefore preferable because it will give a positive indication which may be easily observed by the operator and does not require a close inspection of the graduations on the dial.

One advantage of my invention is that the operator of a car always has at hand and subject to observation at any time and at frequent intervals means for informing him as to the condition of his brakes. This is an advantage of great importance because the defective and inefficient condition of brakes at the present time in motor vehicles is largely due to lack of knowledge on the part of the operator as to the condition of the brakes. Furthermore an automobile equipped with such a device would make it the duty of the operator to have his brakes properly repaired as soon as the instrument indicated that they were not up to standard and this very fact of itself would obviate a great many accidents now due to defective brakes.

It is to be understood that the present invention is not to be limited to any specific form of measuring instruments because various forms may be used for this purpose nor to the particular form of the casing and the levelling means since my invention may be embodied in various forms of construction all within the purview of the following claims.

What I claim is:

1. In a device of the character described, the combination of a casing adapted to be fixed in position in an opening in the dashboard of a motor vehicle, said casing having an opening in its exposed end permitting the reading of a dial within said casing, a measuring instrument mounted within said casing and means operable from outside said casing for levelling said instrument within said casing and independently thereof to compensate for variations in the level of the body of the motor vehicle in which it is mounted; said means comprising a screw rotatably mounted in the bottom of said casing and extending into said casing, a travelling nut threaded on said screw within said casing and a spring carried by said nut for engaging loosely the bottom of said measuring instrument for supporting the same.

2. In a device of the character described, the combination of a casing adapted to be fixedly mounted on the dash-board or other suitable part of a motor vehicle, a measuring instrument pivotally mounted at its front end in said casing and means operable from outside said casing for levelling said instrument within said casing and independently thereof longitudinally to compensate for the longitudinal variations in the level of the motor vehicle; said means comprising a screw rotatably mounted in the bottom of said casing and extending into said casing, a traveling nut threaded on said screw within said casing and a spring carried by said nut for engaging loosely the bottom of said measuring instrument for supporting the same.

3. In a device of the character described, the combination of a casing adapted to be fixedly mounted on the dash-board or other suitable part of a motor vehicle, an instrument for measuring the acceleration or deceleration of said motor vehicle mounted in said casing and means operable from outside said casing and within the control of the operator of the motor vehicle for levelling said instrument longitudinally within said casing and independently thereof to compensate for longitudinal variations in the level of the motor vehicle; said means comprising a screw rotatably mounted in the bottom of said casing and extending into said casing, a traveling nut threaded on said screw within said casing and a spring carried by said nut for engaging loosely the bottom of said measuring instrument for supporting the same.

4. In a device of the character described, the combination of a casing adapted to be fixed on the dash-board or other suitable part of a motor vehicle, an instrument for measuring the acceleration or deceleration of said motor vehicle pivotally mounted at its front end in said casing to permit it to be levelled in a direction parallel with the longitudinal axis of the motor vehicle and means for moving said instrument pivotally to compensate for longitudinal variations in the level of the motor vehicle; said means comprising a screw rotatably mounted in the bottom of said casing and extending into said casing, a traveling nut threaded on said screw within said casing and a spring carried by said nut for engaging loosely the bottom of said measuring instrument for supporting the same.

5. In a device of the character described, the combination of a casing adapted to be fixed in position, a measuring device provided with a dial at one end and pivotally mounted at its dial end in said casing, a closure for said casing provided with an opening permitting said dial to be read, a screw loosely mounted in the bottom of said casing and provided with a knob on the outside of said casing for turning said screw, a traveling nut threaded on said screw within said casing and a helical spring carried by said nut for supporting the rear end of said measuring device and for moving said measuring device pivotally to level it longitudinally when said screw is turned.

6. In a device of the character described, the combination of a casing adapted to be fixed in position on the dash-board or other suitable part of a motor vehicle and provided with an opening in view of the operator, a measuring instrument in said casing with its indicating means viewable through the said opening in said casing, said instrument being pivotally mounted at its front end to permit it to be levelled in a direction parallel to the longitudinal axis of the vehicle and means within the control of the vehicle operator for levelling said instrument to compensate for longitudinal variations in the level of the motor vehicle; said means comprising a screw set upright in the bottom of said casing and extending downwardly through the bottom thereof to receive a knob, a traveling nut threaded on said screw and a spring carried by said nut and adapted to loosely engage and support the rear end of said measuring device.

In witness whereof, I hereunto set my hand this fifth day of February, 1927.

EDWARD R. SMITH.